(12) United States Patent
Genderjahn et al.

(10) Patent No.: US 9,620,271 B2
(45) Date of Patent: Apr. 11, 2017

(54) ACTUATOR

(71) Applicant: ContiTech Vibration Control GmbH, Hannover (DE)

(72) Inventors: Robert Genderjahn, Hannover (DE); Stefan Preussler, Neustadt (DE); Hans-Juergen Karkosch, Hemmingen (DE); Peter-Michael Marienfeld, Marklohe (DE)

(73) Assignee: ContiTech Vibration Control GmbH, Hannover (DE)

( * ) Notice: Subject to any disclaimer, the term of this patent is extended or adjusted under 35 U.S.C. 154(b) by 8 days.

(21) Appl. No.: 14/199,819

(22) Filed: Mar. 6, 2014

(65) Prior Publication Data

US 2014/0184369 A1 Jul. 3, 2014

Related U.S. Application Data

(63) Continuation of application No. PCT/EP2012/064777, filed on Jul. 27, 2012.

(30) Foreign Application Priority Data

Sep. 6, 2011 (DE) .......................... 10 2011 053 289

(51) Int. Cl.
*G06F 1/16* (2006.01)
*H05K 5/00* (2006.01)
(Continued)

(52) U.S. Cl.
CPC ............. *H01F 5/00* (2013.01); *H01F 7/081* (2013.01); *H01F 7/11* (2013.01); *H01F 7/13* (2013.01); *H02K 33/18* (2013.01)

(58) Field of Classification Search
CPC ... H02K 33/18; H01F 7/11; H01F 7/13; H01F 5/00; H01F 7/081
(Continued)

(56) References Cited

U.S. PATENT DOCUMENTS 1,872,369 A * 8/1932 Van Sickle ................... 335/256
2,781,461 A 2/1957 Booth et al.
(Continued)

FOREIGN PATENT DOCUMENTS

EP 1 538 732 A2 6/2005
JP 2004-140901 A 5/2004
(Continued)

OTHER PUBLICATIONS

International Search Report dated May 17, 2013 of international application PCT/EP2012/064777 on which this application is based.

*Primary Examiner* — Bernard Rojas
(74) *Attorney, Agent, or Firm* — Walter Ottesen, P.A.

(57) ABSTRACT

An actuator has an electrically conductive coil which has a longitudinal axis and a plurality of turns and a magnet arranged at a distance from the turns in radial direction relative to the longitudinal axis. The coil is partially covered by a central region of a first conducting element on a side which faces away from the magnet and the magnet is partially covered by a mid region of a second conducting element on a side facing away from the turns of the coil. The first conducting element projects beyond the coil and the second conducting element projects beyond the magnet in the direction of the longitudinal axis and there each have collar-like projections. The coil has a first winding turns region and a second winding turns region.

26 Claims, 5 Drawing Sheets

(51) Int. Cl.
    *H05K 7/00*     (2006.01)
    *H01F 5/00*     (2006.01)
    *H02K 33/18*     (2006.01)
    *H01F 7/11*     (2006.01)
    *H01F 7/13*     (2006.01)
    *H01F 7/08*     (2006.01)

(58) Field of Classification Search
    USPC .................. 335/220–229, 23, 234, 235, 256,
                                  335/266–268; 251/129.1–129.15
    See application file for complete search history.

(56) References Cited

U.S. PATENT DOCUMENTS

| | | | |
|---|---|---|---|
| 5,920,247 A * | 7/1999 | Pischinger et al. ............ | 335/229 |
| 6,476,702 B1 | 11/2002 | Hartwig et al. | |
| 7,990,663 B2 * | 8/2011 | Ziegler et al. .................. | 361/42 |
| 8,237,527 B2 * | 8/2012 | An ................................ | 335/229 |
| 8,387,945 B2 * | 3/2013 | Cope ............................. | 251/65 |
| 2006/0049901 A1 * | 3/2006 | Bottcher .................. | H01F 7/066 |
| | | | 335/229 |
| 2008/0204176 A1 * | 8/2008 | Sriraksat et al. ............. | 335/234 |
| 2010/0277264 A1 * | 11/2010 | Charnley et al. ............. | 335/234 |
| 2012/0068796 A1 * | 3/2012 | Santichen et al. ............ | 335/256 |
| 2013/0241675 A1 * | 9/2013 | Simonin .......................... | 335/6 |

FOREIGN PATENT DOCUMENTS

| | | | |
|---|---|---|---|
| JP | 2005294683 A | * | 10/2005 |
| JP | 2009-273224 A | | 11/2009 |

* cited by examiner

ACTUATOR

CROSS REFERENCE TO RELATED APPLICATIONS

This application is a continuation application of international patent application PCT/EP2012/064777, filed Jul. 27, 2012, designating the United States and claiming priority from German application 10 2011 053 289.7, filed Sep. 6, 2011, and the entire content of both applications is incorporated herein by reference.

BACKGROUND OF THE INVENTION

Such an actuator is known from U.S. Pat. No. 6,476,702, for example. This actuator has an electrically conductive coil, which has a longitudinal axis and a plurality of turns, and including at least one magnet, which is arranged spaced apart from the turns of the coil in the radial direction R with respect to the longitudinal axis L. The coil is at least partially covered on a side remote from the magnet by a central region of a first conducting element, and the at least one magnet is at least partially covered on a side remote from the turns of the coil by a central region of a second conducting element. The first conducting element protrudes beyond the coil, and the second conducting element protrudes beyond the at least one magnet, in the axial direction with respect to the longitudinal axis L, and the first and second conducting elements each have collar-like projections there. Such actuators contain an oscillatory mass-spring system, which is excited so as to produce oscillations when an alternating current is driven through the turns of the electrically conductive coil.

The at least one magnet has a magnetization with a magnetization direction which is ideally perpendicular to the longitudinal axis of the coil. If a current now flows through the coil, a Lorentz force acts in the direction of the longitudinal axis of the coil. As described in U.S. Pat. No. 6,476,702, the interaction of the magnetic lines of force emerging from the collar-like projections of the first conducting element and the second conducting element or the magnetization of the magnet, which advantageously likewise consists of a material of high permeability, results in a further force, which acts in the same direction as the described Lorentz force. Since the magnetic lines of force are conducted in specific directions by the first and second conducting elements, both component parts are in this case referred to as conducting elements.

In the case of an actuator of the generic type, either the coil with the first conducting element or the magnet with the second conducting element is mounted in a sprung manner, while the corresponding other assembly is mounted statically. If a current now flows through the coil, the abovementioned forces result in a shift in the spring-mounted assembly and therefore in a movement of the actuator. In this way, valves can be opened or closed, for example.

If an alternating current flows through the coil instead of the direct current, the direction of the acting forces reverses along with the current flow direction. In this way, the spring-mounted assembly is caused to oscillate. By targeted selection of the amplitude, frequency and phase of the applied alternating current, the oscillation of the actuator can be controlled very precisely. In this way, for example, oscillations can be produced or an oscillation in phase opposition can be superimposed on already existing oscillations and these already existing oscillations can thus be compensated for.

One disadvantage is the fact that the excitation force that can be achieved with such an actuator in accordance with the prior art is relatively low in relation to the physical volume required for this.

It is also disadvantageous that the usable frequency range in which such an actuator can be operated on alternating current is subject to restrictions. Firstly, the first natural frequency of the system, which is the lowest frequency at which the actuator can be operated, cannot be shifted to lower frequencies. Secondly, the working range in the higher-frequency range is limited owing to the low amount of coil installation space and the use of coils with a small wire diameter associated therewith.

A further disadvantage when using alternating current consists in that, as the frequency of the current increases, the inductive reactance of the coil and therefore also the total impedance increase. On a predetermined voltage of 12 V, for example, as prevails in the electric power supply system of a typical passenger vehicle, the level of the drivable current is therefore reduced depending on, inter alia, the inductance and the resistance of the coil and the operating frequency of the actuator. In this case, the substantial disadvantage primarily consists in the high inductance of the coil used which has an increasingly negative effect on the performance capacity of the actuator, that is, the achievable dynamic force at a certain operating frequency, as the frequency increases and as a result of the surrounding "iron jacket".

SUMMARY OF THE INVENTION

Therefore, it is an object of the invention to provide an actuator of the kind described above wherein the operational response of the actuator can be influenced and adjusted in order to overcome the abovementioned disadvantages, in particular such that an operational response, which is as linear as possible, is achieved given at the same time a high force density and in particular a large frequency operating range.

Therefore, the present invention relates to an actuator comprising at least one electrically conductive coil, which has a longitudinal axis L and a plurality of turns, and comprising at least one magnet, which is arranged spaced apart from the turns of the coil in the radial direction R with respect to the longitudinal axis L. The at least one coil is at least partially covered on a side remote from the magnet by a central region of a first conducting element, and the at least one magnet is at least partially covered on a side remote from the turns of the at least one coil by a central region of a second conducting element. The first conducting element protrudes beyond the at least one coil, and the second conducting element protrudes beyond the at least one magnet, in the axial direction with respect to the longitudinal axis L, and the first and second conducting elements each have collar-like projections there. The at least one coil has at least one first turns region and one second turns region.

The invention is based on the knowledge of using a plurality of electrically conductive coils or turns regions of at least one coil to be able to influence and adjust in a targeted manner the operational response of the actuator. In other words, by dividing the previously only one coil in known actuators into at least two coils or two turns regions of at least one coil, possibilities are provided for influencing and adjusting the operational response of the actuator which are not provided when using a single coil with a single turns region. A coil with two turns regions is understood within the meaning of this invention to also mean at least two separate coils which together serve to excite an actuator and therefore form a common actuator coil, irrespective of their structural configuration.

The configuration of the number of turns per turns region or else the configuration of the cross section (diameter) of the turns per turns region are among these possibilities for influencing and adjusting the operational response of the actuator. The operational response of the actuator can likewise be influenced by the feed to the coils or turns regions, for example by a feed with different amplitudes, frequencies and/or phases.

By virtue of these possibilities according to the invention for influencing and adjusting the operational response of the actuator, a reduction in the inductance of the coil system or of the actuator can be achieved, for example. In addition, there is the possibility of extending the operating frequency range of the actuator. An increase in the actuator force can be achieved, in particular at high frequencies. It is also possible for an increase in the force density, that is, a greater excitation force in relation to the physical volume of the actuator, to be effected, in particular at high frequencies. Targeted adjustment of the actuator for a plurality of special frequency ranges is also possible.

In this case, the two turns regions are embodied so as to be electrically insulated at least from one another and from the conducting element, in the same way as the turns of each turns region are embodied so as to be electrically insulated from one another. This means that the turns of the two turns regions in the region of the coil do not have any electrical contact with one another if the feed comes from outside the coil or the actuator. Thus, for example, the turns of the two turns regions can bear against one another, that is, the turns of the two turns regions or the insulation of the respective turns wires touch one another. It is also possible for the turns regions to merge into one another, that is, the coil has at least one region in the axial direction with respect to the longitudinal axis L and/or in the radial direction R with respect to the longitudinal axis L in which turns of both turns regions are arranged. In this case, at least one turns region can also have turns which are arranged outside this common region. It is also possible for the two turns regions to be arranged spaced apart by a spacer element in the axial direction with respect to the longitudinal axis L and/or in the radial direction R with respect to the longitudinal axis L. This spacer element then separates the two turns regions by, for example, a film or material layer, which is preferably not or only slightly magnetically conductive.

In accordance with a further aspect of the invention, the first turns region and the second turns region are connected in parallel with one another. It is advantageous to connect the two turns regions in parallel with one another because, in this way, the total inductance and the total ohmic resistance and therefore the total impedance are reduced. This effect of the reduced inductance as a result of at least two coils or turns regions of at least one coil being connected in parallel is intensified by a multiple by the conducting element, such as, for example, a core which surrounds the coil or turns regions in the actuator.

The use of at least two coils or turns regions of at least one coil operated in parallel preferably makes it possible to achieve high dynamic actuator forces even at high operating frequencies on a predetermined, upwardly limited operating voltage. In this case, it is particularly advantageous if current flows through all of the coils or turns regions in the same direction.

In accordance with one aspect of the invention, the first turns region and the second turns region have the same or a different number of turns. Providing the first and second turns regions with the same number of turns is advantageous because the complexity of the driving is thus reduced. It is also possible for the two turns regions to be wound using identical tools, as a result of which the production costs are reduced. It is also possible for at least two coils with 1/2*n turns to be used instead of one coil with n turns in the same amount of physical space. As a result, the same forces can be achieved in the case of low-frequency excitation or higher forces can be achieved than with only one coil with a single turns region in the case of high-frequency excitation. The total copper content remains the same, that is, there are no additional costs as a result of more copper material.

Providing the first and second turns regions with a different number of turns is advantageous because the operational response of the actuator can thus be influenced via the configuration of the coil. It is thus possible for the two turns regions to each be adjusted to match a different frequency range of excitation.

In accordance with a further aspect of the invention, the cross sections of the turns of the first turns region and the second turns region are the same or different. Providing the two turns regions with turns with the same wire cross section is advantageous because then uniform wires for winding the coil, that is, for winding the turns regions, can be used. As a result, the complexity and therefore the costs of production can be reduced. Then, the two turns regions also have the same total inductance and the same total ohmic resistance and therefore the same total impedance (given the same turns number).

Providing the two turns regions with turns with different wire cross sections is advantageous because the operational response of the actuator can thus be influenced via the configuration of the coil. It is thus possible for the two turns regions to each be adjusted to match a different frequency range for the excitation.

In accordance with one aspect of the invention, the first turns region and the second turns region are fed by a common or by in each case a different voltage or current source. This includes the fact that both turns regions can have a feed with identical or different amplitudes, frequencies and/or phases.

Feeding the two turns regions using a common voltage or current source is advantageous because only a single voltage or current source is thus required for the actuator. As a result, the complexity of the actuator, in particular in respect of the wiring of the coil or the turns regions, the size of the actuator and the costs of the actuator can be reduced.

Feeding the two turns regions using in each case a different voltage or current source is advantageous because the two turns regions can be operated at different voltage or current intensities (amplitudes) or else frequencies. Thus, the operational response of the actuator can be influenced via the separate feed or driving of the turns regions of the coil. In particular, the two turns regions can thus each be adjusted to match a different frequency range for the excitation.

In accordance with a further aspect of the invention, the first turns region has a larger number of turns than the second turns region. The first turns region has turns with a smaller cross section than the turns of the second turns region. The first turns region is operated at a lower frequency than the second turns region.

In this preferred configuration according to the invention, at least two non-identical coils or turns regions of at least one common coil which are not connected in parallel (are each fed independently) are operated by means of in each case a different driving or feeding in different frequency ranges. In this way, the first coil or the first turns region with many turns and a thin wire cross section is adjusted to match the generation of high actuator forces in the case of low frequencies and the second coil or the second turns region with a few turns is adjusted to match the generation of actuator forces even at very high frequencies.

According to one aspect of the invention, the first conducting element and/or the second conducting element consist(s) of a soft-magnetic powder composite material. Powder composite materials, so-called soft-magnetic composites (SMC), consist of a powder of a material which has a high permeability. The individual grains of powder are electrically insulated from one another by thin layers of synthetic resin, for example.

This preferred aspect of the invention is based on the finding that, by virtue of the use of a soft-magnetic powder composite material as at least one of the two conducting elements, the extent of this conducting element, that is, the component part thickness, can be markedly reduced. In particular the central region of the first and/or second conducting element(s) can now be designed to be markedly thinner, with the result that space and installation space can be saved here. This can now be used to provide more coil turns per turns region of the at least one coil or a greater wire cross section given the same turns number per turns region of the at least one coil with the same external dimensions of the actuator. By virtue of both measures, the magnetic field and thus the achievable excitation force are markedly increased. The lower component part thickness of the first and/or second conducting element(s) can also be used to reduce the required physical volume given the same coil geometry and the same wire cross section and therefore the same excitation force, however.

In addition, by virtue of increasing the wire cross section of a turns region or of both turns regions of the at least one coil, the working range of the actuator can be shifted towards higher frequencies.

The use of soft-magnetic powder composite materials, so-called soft-magnetic composites (SMC) also provides the advantage that production takes place in the pressing method, or during sintering. As a result, very high densities can be achieved and the manufacturing costs can be markedly reduced in comparison with the mechanical working of iron materials or the production of laminate stacks. In addition, owing to the fact that the soft-magnetic powder composite materials consist of a powder of a material with high permeability and the individual powder grains are electrically insulated from one another by a thin insulating layer, the magnetic properties of the first and/or second conducting element(s) are further improved and the magnetic losses are further reduced. In comparison with the advantages which are provided by the small component part extent and the low component part volume associated therewith, this is only a subordinate effect, however.

Advantageously, the first conducting element and/or the second conducting element has/have an extent of less than 3 mm, preferably less than 2 mm, in the central region of the conducting element(s) in the radial direction R with respect to the longitudinal axis L. In comparison with actuators from the prior art, the wall thickness of the respective conducting element in this region can therefore sometimes be more than halved. This results in additional installation space, which can either be used for measures which increase the excitation force or can be saved as installation space for the finished actuator.

Alternatively, it is also possible for the at least one coil to be sheathed with plastic or the like, for example, without restrictions in respect of turns number and wire diameter needing to be accepted.

In a preferred exemplary embodiment of the invention, the collar-like projections of the first conducting element have an extent (d) in the axial direction with respect to the longitudinal axis L. The collar-like projections of the second conducting element have an extent D in the axial direction with respect to the longitudinal axis L, wherein it has proven to be particularly advantageous if the ratio of extent d/D is between 0.6 and 0.8. An optimum magnetic rigidity is thus achieved. In addition, the actuator demonstrates a linear operational response as long as the maximum deflection of the spring-mounted assembly, that is, either the first conducting element with the at least one coil or the at least one magnet with the second conducting element, is less than ±d/2 along the longitudinal axis L of the at least one coil.

It has proven to be particularly advantageous if both the first conducting element and the second conducting element consist of a soft-magnetic powder composite material. As a result, the eddy currents and the magnetic losses associated therewith can be reduced in both conducting elements and the density can be increased, and therefore the achievable excitation force can possibly be increased. In addition, the required installation space can be reduced in the case of both conducting elements.

Preferably, the at least one magnet is arranged in the form of a ring around the at least one coil. By virtue of a rotational symmetrical configuration of the actuator, the total lateral surface area of the at least one coil can be used for the interaction with the at least one magnet, with the result that the excitation force achieved is also maximized in this regard. Preferably, given this configuration of the actuator, the second conducting element is arranged in the form of a ring around the at least one magnet and comprises a plurality of parts, in particular two half-shells.

The second conducting element which is arranged in the form of a ring around the at least one magnet can in this case complete a rotationally symmetrical configuration about the longitudinal axis of the at least one coil. Thus, the force which is caused by the interaction of the magnetic lines of force emerging from the core with the at least one magnet or the second conducting element is also used to the full extent around the at least one coil and therefore maximized. In this configuration, the first conducting element is located in the at least one coil and forms the core of the coil. It is preferably likewise formed rotationally symmetrically with respect to the longitudinal axis L of the at least one coil. The second conducting element is arranged on the outside of the actuator and forms the lateral surface or casing of the actuator.

As an alternative to this configuration, the at least one coil can also be arranged in the form of a ring around the at least one magnet. In a particularly preferred configuration of the invention, the first conducting element is then arranged in the form of a ring around the at least one coil and comprises a plurality of parts, in particular two half-shells. In this configuration, the second conducting element together with the at least one magnet forms the core of the at least one coil and of the actuator. The first conducting element, as the outermost of the component parts described here, defines the casing of the actuator.

In both embodiments and arrangements, the actuator functions and the advantages of the invention have full effect.

Owing to the fact that the casing is produced in a plurality of parts, in particular comprising two identical or symmetrical half-shells consisting of the powder composite material, the manufacture is simplified, manufacturing costs are reduced, and installation is facilitated. This provides the possibility of clamping the at least one coil or the at least one magnet between the two half-shells, with the result that a secure hold in the system is realized. Thus, additional complex adhesive bonding or the like is not required, as a result of which the production is further simplified.

Advantageously, the at least one magnet has a greater extent than the at least one coil in the axial direction with respect to the longitudinal axis L. It has proven to be advantageous if the at least one magnet protrudes beyond the at least one coil by 2 mm to 5 mm, preferably by 3 to 5 mm, particularly preferably by 4 mm, in the axial direction with respect to the longitudinal axis L. This applies advantageously in each case to both sides of the at least one coil in the longitudinal direction L.

In this case, the collar-like projections of the first conducting element protrude beyond the at least one magnet by 1 mm to 3 mm, preferably by 2 mm in the axial direction. This also preferably applies to both sides in the longitudinal direction L of the at least one coil. A linear actuator response within the mentioned deflection range of the spring-mounted component part group can be ensured with the mentioned dimensions.

Preferably, the at least one coil and the first conducting element or the at least one magnet and the second conducting element are mounted in a sprung manner on at least one multiple-arm spring washer. With this configuration, disadvantages of the leaf springs used in the prior art in respect of rigidity, linearity and fatigue strength are compensated for. Actuators from the prior art also have a very high degree of magnetic rigidity along the longitudinal axis L of the at least one coil. In order to compensate for this magnetic rigidity, a very high degree of spring rigidity is required. This is disadvantageous for the fatigue strength properties and the lower resonant frequency of the system. By virtue of the magnetic rigidity and the spring rigidity being superimposed, the total rigidity of the system is provided. In order that the operational response of the actuator is linear within the maximum deflection, the total actuator rigidity must also be linear.

A multiple-arm spring washer enables a linear response, a high fatigue strength and an ideal strain distribution within the spring. Thus, the transverse rigidity occurring perpendicular to the longitudinal axis L of the at least one coil, which transverse rigidity is caused by the magnetic attraction forces, can be absorbed, and the magnetic rigidity along the longitudinal axis L can be compensated for. In addition, in the case of a multiple-arm spring washer, a change in the thickness of the washer makes it possible to realize the spring rigidity for the relevant deflection range easily, quickly and reliably. In this case, fatigue strength properties are not disadvantageously influenced. Thus, the modularity of the entire system in respect of the change in the first natural frequency can also be realized by an uncomplicated replacement of the spring. An optimum spring material is also nonmagnetic and corrosion-protected.

By virtue of the various measures which are complementary to one another and cause synergy effects, the operational response can be influenced and adjusted in various ways, the total inductance or the total resistance can be reduced, a linear operational response can be achieved at the same time as a high power density and in particular with a large frequency operating range, the actuator force can be adjusted to different frequency ranges of the excitation feed, the total rigidity of the system can be altered, the first natural frequency can be shifted to small frequencies and also the maximum achievable excitation force can be increased. Owing to the selection of the extension ratio d/D, for example, it is firstly possible to reduce the magnetic rigidity. Secondly, it is thus possible, however, to also reduce the required rigidity for the leaf springs used, as a result of which the first natural frequency of the system is shifted towards lower frequencies. The selection of the ratio of the number of turns or configuration of the cross section of the turns between the at least two turns regions of the at least one coil can be used to influence and adjust the operational response in various ways, as can the type of feed to the turns regions, for example, at different amplitudes, frequencies and/or phases.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
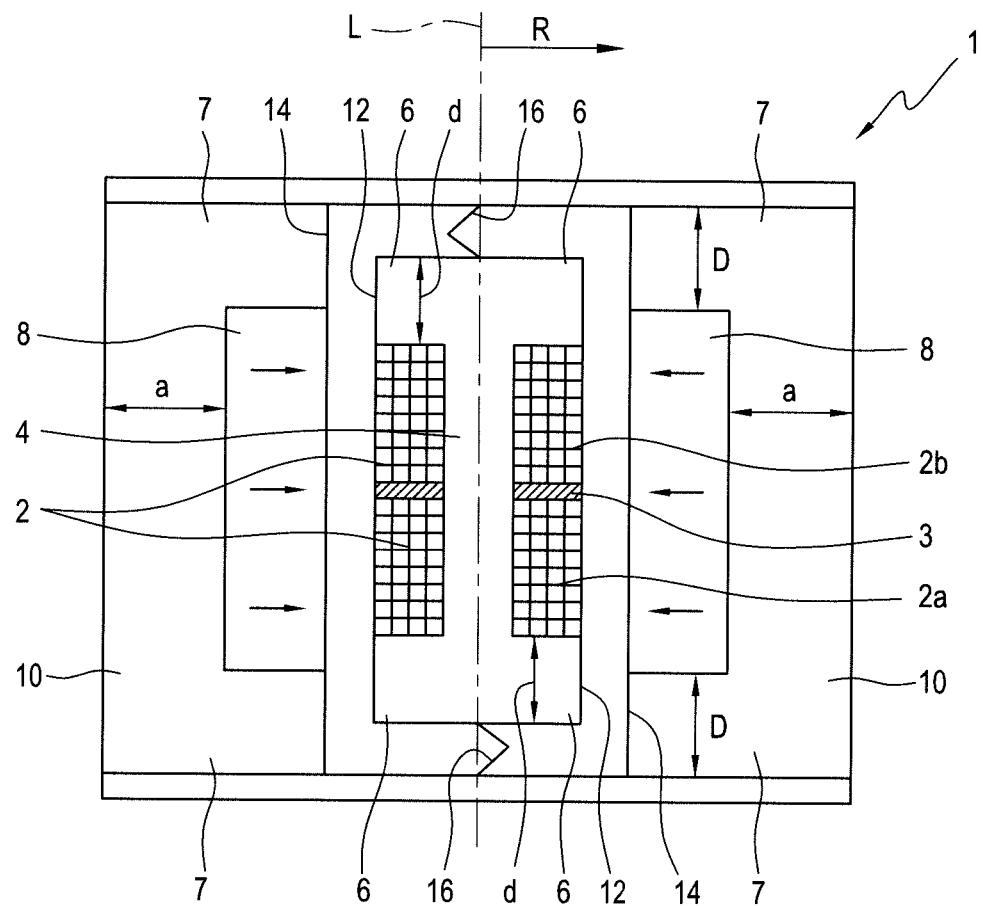
FIG. 1A is a schematic cross section through an actuator in accordance with a first embodiment of the present invention.

FIG. 1A shows a schematic cross section through an actuator 1 in accordance with a first embodiment of the invention. The actuator 1 comprises at least one coil 2, which is wound around a first conducting element 4 and has a longitudinal axis L. The coil 2 is divided into a first, lower turns region 2a and a second, upper turns region 2b, wherein further subdivisions into more than two turns regions are also possible according to the invention. The first turns region 2a can also be considered to be a first coil 2a and the second turns region 2b can be considered to be a second coil 2b of a coil arrangement 2 or actuator coil 2.

Figure 1B:
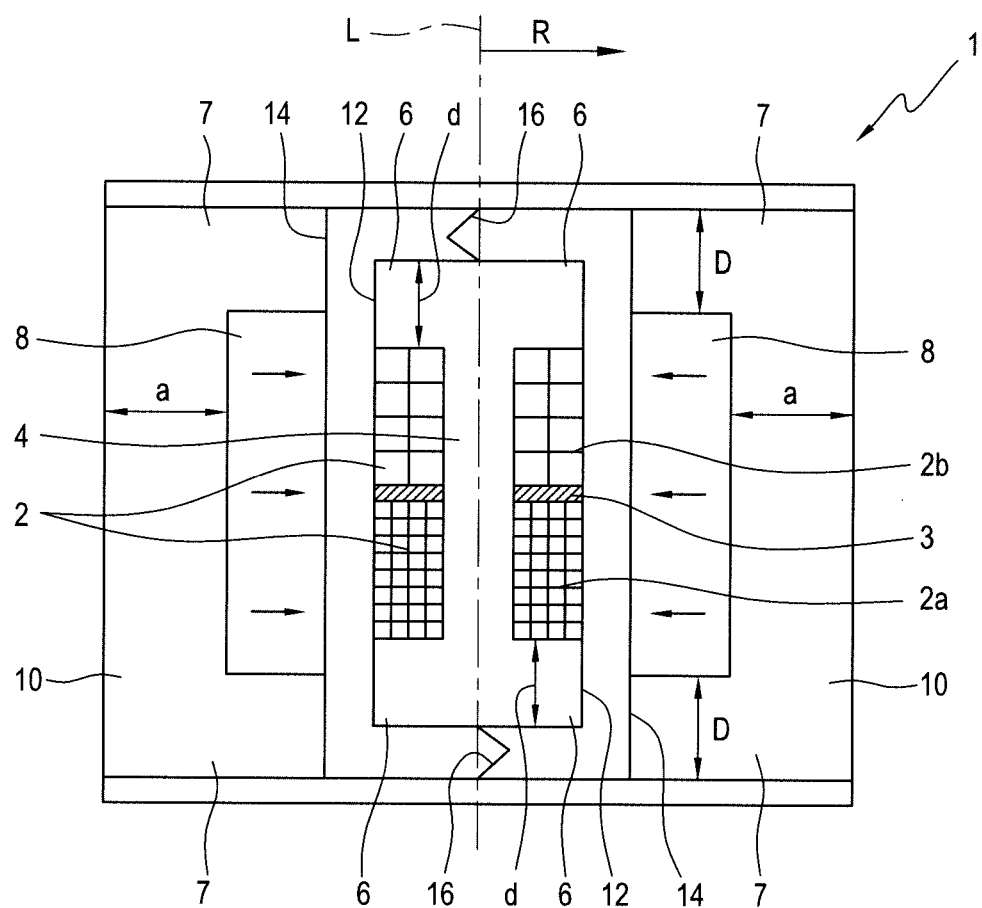
FIG. 1B is a schematic cross section through an actuator in accordance with a second embodiment of the present invention.

The two turns regions (2a, 2b) can in this case, as illustrated by way of example in FIGS. 1A and 1B, be arranged spaced apart by a spacer element 3 in the axial direction with respect to the longitudinal axis L, which is not essential to the invention, however.

The first conducting element 4 protrudes beyond the coil 2 in the axial direction with respect to the longitudinal axis L on both sides and has collar-like projections 6 there. These collar-like projections 6 have an extent (d) in the axial direction with respect to the longitudinal axis L.

In the first embodiment shown in FIG. 1A, the at least one coil 2 with the first conducting element 4 located therein is arranged between two magnets 8. The magnets have a magnetization which is indicated by small arrows in FIG. 1A. The magnets 8 are ideally homogeneously magnetized and have a magnetization direction which, as shown in FIG. 1A, is optimally perpendicular to the longitudinal axis L. In a particularly preferred embodiment, the at least one magnet 8 is arranged in the form of a ring around the at least one coil 2 and the first conducting element 4 located therein.

Each magnet 8 is covered on the side remote from the coil 2 and on two sides lying in the axial direction with respect to the longitudinal axis L by a second conducting element 10. In the first embodiment shown in FIG. 1A, this overlap on the sides is complete, which is not necessary for the invention, however.

The second conducting element 10 protrudes beyond the at least one magnet 8 in the axial direction with respect to the longitudinal axis L in the form of collar-like projections 7 and has an extent D in this region. Advantageously, the ratio of the extent (d) to the extent D is less than 1, in particular between 0.6 and 0.8. This results in optimum overlaps of the mutually opposite end faces 12 of the first conducting element 4 or the collar-like projections 6 and the end faces 14 of the second conducting element 10 or the collar-like projections 7.

If the at least one coil 2 is considered as a whole, that is, independently of the division according to the invention into a first and second turns region (2a, 2b), and if a current is flowing through this coil, different forces are caused which all act in the same direction. Firstly, the current flow in the magnetic field of the magnets 8 results in a Lorentz force, which acts on the coil 2 in FIG. 1A upwards or downwards, that is, along the longitudinal axis of the coil 2. In addition, a magnetic field is induced in the first conducting element 4 and in the collar-like projections 6 by the current through the coil 2. Owing to the interaction of this magnetic field with the second conducting element 10 or the magnet 8, further forces are caused which act in the same direction as the Lorentz force.

According to the invention, however, this "simple" actuator response is changed and influenced. Thus, the at least one coil 2 has at least one first turns region 2a and one second turns region 2b according to the invention, which can have different or else identical configurations and can be fed, that is, excited, differently or else identically.

In this case, FIG. 1A shows a schematic illustration of two turns regions (2a, 2b), which have identically designed turns with respect to, for example, the number of turns, their turns cross section (wire cross section), their turns spacing from one another (bearing against one another) or else their physical arrangement around the longitudinal axis L. To be more precise, FIG. 1A shows a coil 2 which has been divided into two identical turns regions (2a, 2b). If these turns regions are now connected in series, that is, the interruption of the coil 2 to form the two turns regions (2a, 2b) is eliminated, the above-described system response of an actuator with a single coil 2 would again be established.

If, however, the two turns regions (2a, 2b) in accordance with a preferred embodiment of the invention are connected in parallel with one another and are operated with an identical feed (voltage or current), the total inductance or the total resistance of the coil 2 will be reduced. If the at least one coil 2 is divided analogously into more than two turns regions (2a, 2b) and the two turns regions are likewise connected in parallel, as a result the total inductance and the total resistance and therefore the total impedance of the coil 2 can be further reduced. By virtue of this reduction, the intensity of the actuator forces caused by the at least one coil 2 can be increased given the same intensity of the feed since the efficiency is correspondingly increased with reduced losses.

Alternatively, the two turns regions (2a, 2b) can also have a feed with different amplitudes, frequencies and/or phases in accordance with the invention. As a result, the system response can be adjusted to match specific frequency ranges, for example.

As an alternative to the identical configuration of the two turns regions (2a, 2b) shown in FIG. 1A, these turns regions can, according to the invention, also be configured differently. Thus, for example, a turns region (2a, 2b) can extend in the longitudinal direction L over a larger region than the other turns region (2a, 2b). In addition or as an alternative, according to the invention a turns region (2a, 2b) can have a different turns cross section (wire cross section, wire diameter) than the other turns region (2a, 2b). It is also possible according to the invention for the number of turns per turns region (2a, 2b) to be different. Likewise, the feed can be provided by the same source or by different sources with different amplitudes, frequencies and/or phases.

FIG. 1B shows a schematic cross section through an actuator 1 in accordance with a second embodiment of the invention. In this preferred embodiment, the first turns region 2a of the at least one coil 2 has more turns than the second turns region 2b. For this, the turns of the first turns region 2a are designed to have a smaller cross section than the turns of the second turns region 2b. In addition, the turns of the first turns region 2a are fed or excited at a lower frequency than the turns of the second turns region 2b.

By virtue of this preferred configuration of the turns according to the invention and the feed to these turns, high forces can be generated in the actuator both at low and at high frequencies. Thus, for example, the first turns region 2a which, owing to the configuration of its turns, generates high forces even in the case of low-frequency current or voltage feed, with which high forces the low-frequency mechanical oscillations can be effectively reduced, can be used, for example, for oscillation quenching or reduction of low-frequency oscillations. At the same time, the same actuator can also effectively reduce high-frequency mechanical oscillations since, in this case, the second turns region 2b generates the high actuator forces required for this with a high-frequency current or voltage feed. In these intermediate regions of the frequencies of the mechanical oscillations, the two turns regions (2a, 2b) can be operated together, with a weighting between the high-frequency and low-frequency oscillation damping depending on the application case. In this case, the two turns regions (2a, 2b) can in principle be operated in all frequency ranges, but they demonstrate in each case their greatest effect, either individually or together, precisely in the frequency ranges to which they are matched in design terms.

In the embodiments shown in FIGS. 1A and 1B, the at least one coil 2 and the first conducting element 4 located therein are spring-mounted via springs 16. Alternatively, the magnet 8, with the second conducting element 10, can also be spring-mounted instead of the coil 2 with the first conducting element 4.

Owing to the forces induced by the current flow through the at least one coil 2, in the embodiments shown in FIGS. 1A and 1B, the at least one coil 2 and the first conducting element 4 are shifted along the longitudinal axis L.

In this case, the first conducting element 4 and/or the second conducting element 10 preferably consist(s) of a soft-magnetic powder composite material. It is thus possible to reduce the extent (a) of the respective conducting element (4, 10) in the radial direction R with respect to the longitudinal axis L. The extent (a) of the second conducting element, which is illustrated in FIGS. 1A and 1B, is in particular less than 3 mm, particularly preferably less than 2 mm. In this way, the installation space required for the actuator 1 can be markedly reduced. Owing to the low installation space requirement for a first conducting element 4 consisting of a soft-magnetic powder composite material, the installation space required for the actuator 1 is also reduced.

However, if the installation space is available, the magnet 8, which is surrounded by the second conducting element 10, can be arranged further removed from the at least one coil 2 and the first conducting element 4 located therein in the radial direction R with respect to the longitudinal axis L owing to the very small extent (a) of the second conducting element 10. As a result, the installation space available for the at least one coil 2 is increased, with the result that a wire with a larger cross section or a higher turns number or even a combination of the two can be used for one of the turns regions (2a, 2b) or both turns regions (2a, 2b), for example. As a result, the frequency range in which the actuator can be operated is increased and/or the maximum achievable excitation force is increased.

As an alternative to the described embodiment of the present invention, it is also possible for the at least one magnet 8 to be arranged on the inside and the at least one coil 2 on the outside in the actuator. In this case, the at least one magnet 8 is located in the interior of the at least one coil 2 and thus also in the interior of the two turns regions (2a, 2b), but remains spaced apart from the turns of the at least one coil 2 in the radial direction R with respect to the longitudinal axis L of the coil. That side of the magnet 8 which is remote from the turns and is at least partially covered by the second conducting element 10 is then the side which is spaced further apart from the two turns regions (2a, 2b) of the at least one coil 2, with the result that the second conducting element 10 is located in the center of the rotationally symmetrical actuator. It has proved to be particularly advantageous if the size ratios described for the embodiment shown in FIG. 1 apply in this case, too.

Figure 3:
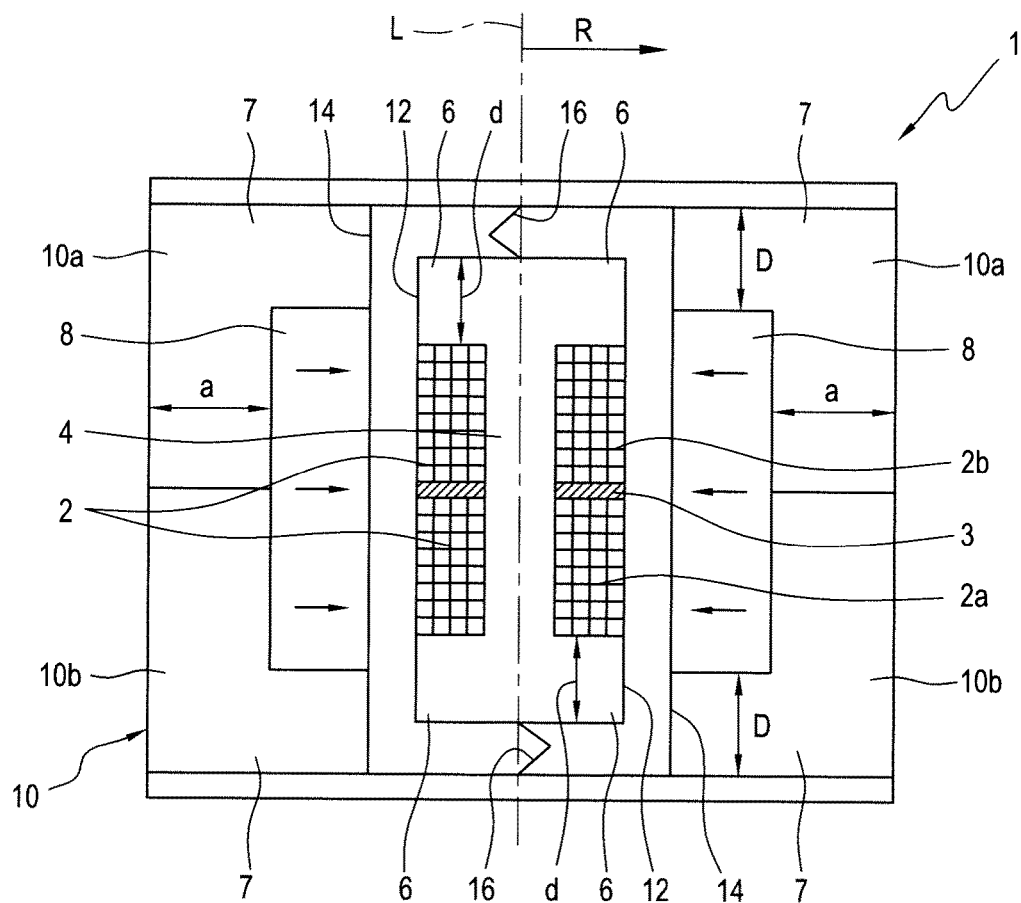
FIG. 3 is a schematic cross section through an actuator in accordance with a third embodiment of the present invention wherein the second conducting element is annularly arranged about the magnet and includes a plurality of parts; and, FIG. 4 is a schematic cross section through an actuator in accordance with a fourth embodiment of the present invention wherein the coil is configured to be disposed around the magnet.

FIG. 3 shows an embodiment of the actuator wherein the second conducting element 10 is annularly arranged about the magnet 8 and includes a plurality of parts, namely, a first half shell 10a and a second half shell 10b.

Figure 4:
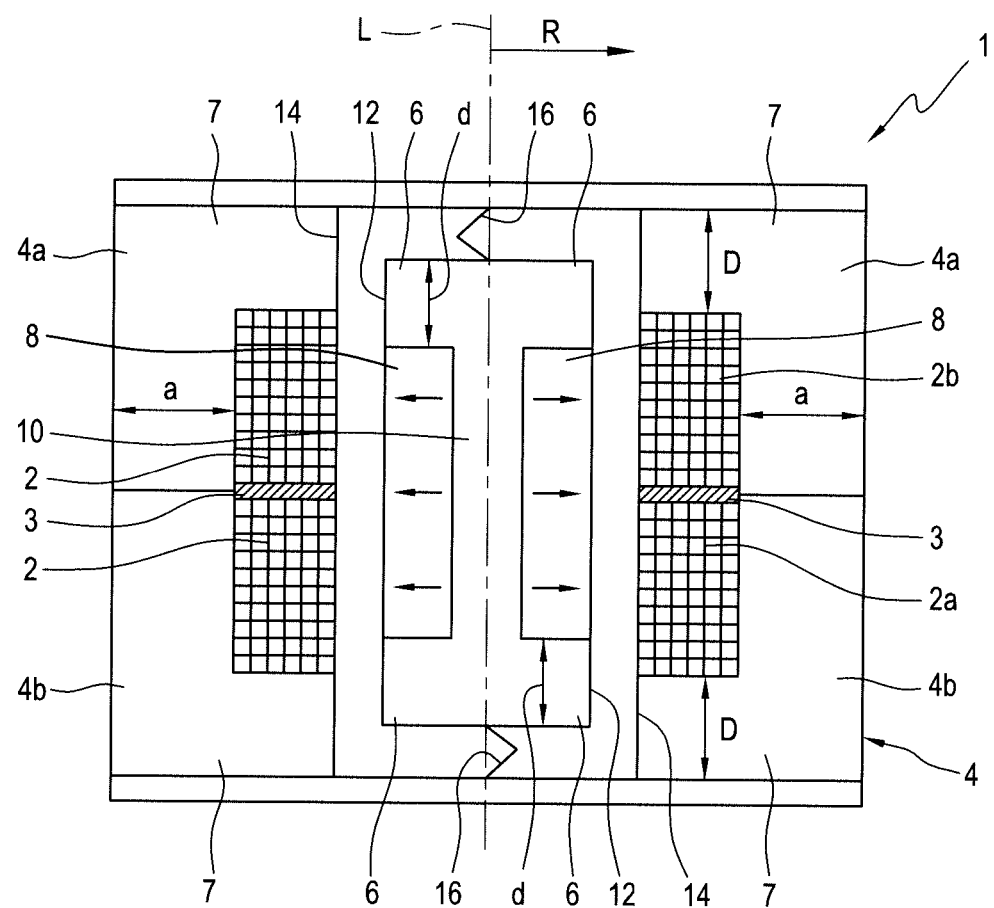

FIG. 4 shows the embodiment of the actuator wherein the coil 2 having two turns regions (2a, 2b) is configured to be disposed annularly around the magnet 8. Also in FIG. 4, the first conducting element 4 is made up of a first half shell 4a and a second half shell 4b. The first conducting element 4 is configured to be arranged annularly around the coil 2.

Figure 2:
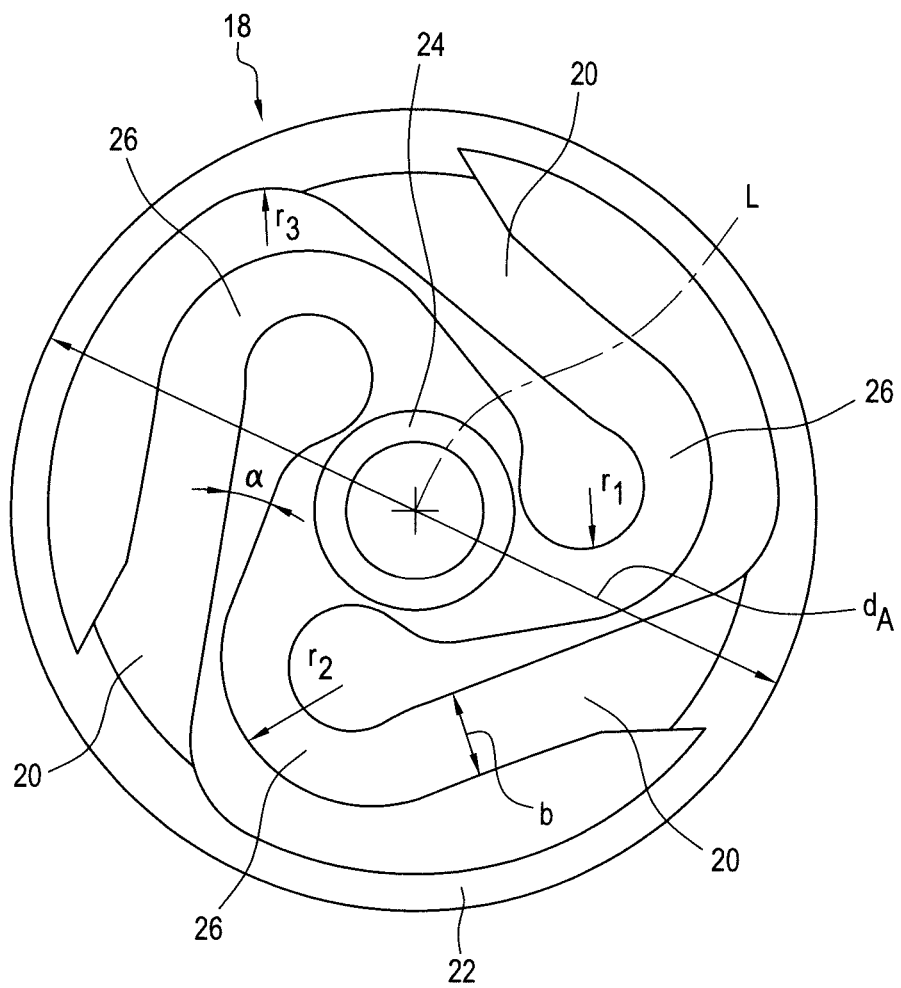
FIG. 2 is a plan view of a spring washer for use in an actuator in accordance with the first or second embodiment of the present invention.

FIG. 2 shows a plan view of a spring washer 18 which can be used in an actuator. Such a multiple-arm spring washer 18 is suitable for spring-mounting, for example, the at least one coil 2 and the first conducting element 4. The longitudinal axis L of the coil 2 runs out of the plane of the drawing in the exemplary embodiment shown in FIG. 2. Such a spring washer 18 is capable of absorbing the transverse rigidities occurring in the radial direction R with respect to the longitudinal axis L, which transverse rigidities are caused by the magnetic attraction forces. In particular owing to the interaction between the coil 2, through which a current may be flowing, the first conducting element 4 located therein and the magnet 8, magnetic attraction forces occur which add up to zero only in the case where the coil 2 is arranged precisely centrally between the magnets 8. Since this is virtually never completely achievable, however, effective magnetic forces are always present in an actuator 1 which can be absorbed by a spring washer 18, as is shown in FIG. 2.

A spring washer 18 is also capable of compensating for the magnetic rigidity in the axial direction with respect to the longitudinal axis L.

The design of a spring washer 18 shown in FIG. 2 is particularly advantageous since it makes it possible to change the spring rigidity by virtue of the spring thickness alone, that is, the extent of the spring washer 18 perpendicular to the plane of the drawing, and to match the spring rigidity to the respective conditions of the actuator 1. In this case, the fatigue strength properties of the spring are not disadvantageously influenced. If in the case of a given actuator 1 the first natural frequency needs to be changed, this can be realized easily by an uncomplicated replacement of the spring, which is easy to implement, wherein a spring washer 18 of a first thickness is replaced by a spring washer 18 of a second thickness, which can be greater than or less than the first thickness.

The spring washer 18 shown in plan view in FIG. 2 has three spring arms 20, which are arranged at a distance of 120° on an outer rim 22 of the spring washer 18. The spring arms 20 run from the outer rim 22 of the spring washer 18 to a central washer 24, on which the component part to be mounted is mounted. In the exemplary embodiment shown in FIG. 2, the spring arms 20 in this case first run in the clockwise direction past the central washer 24 in order to then change direction at a turning point 26 and run towards the central washer 24. The spring arms 20 can naturally also first run in the counterclockwise direction, with the spring washer 18 then having a mirror-inverted configuration.

The piercing point of the longitudinal axis L of the at least one coil 2 forms the center point of the spring washer 18. The advantage with the design shown in FIG. 2 consists in that the design can be scaled easily for larger and smaller actuators 1. In this case, the scaling variable to which all other dimensions are related is the outer diameter $d_A$ of the spring washer 18. The dimensions mentioned below are always cited as units of this outer diameter $d_A$. It has proven to be particularly advantageous if the following dimensions and distances are adhered to. An inner radius $r_1$ of the turning point 26 is advantageously 0.08 times the outer diameter $d_A$. The outer radius $r_2$ of the turning point 26 is advantageously 0.19 times the outer diameter $d_A$. The transition radius $r_3$ of the curvature with which the spring arm 20 makes the transition to the outer rim 22 of the spring washer 18 is advantageously 0.16 times the outer diameter $d_A$.

Depending on the angle through which the spring washer 18 is rotated about the center point or the longitudinal axis L of the coil 2, the position of the center points of the curvatures from which the radii $r_1$, $r_2$ and $r_3$ start is different in each case. The relative position of the center points with respect to one another naturally remains the same, however. Given a specific angle position, three center points can advantageously be described by the following dimensions. The center point of an inner curvature of a turning point 26 of a first spring arm 20, in a plan view, is shifted towards the right through 0.16 outer diameter $d_A$ and downwards through 0.14 outer diameter $d_A$. At the same time, the center point of an outer radius $r_2$ of a second spring arm 20 is shifted towards the left through 0.18 outer diameter $d_A$ and downwards through 0.04 outer diameter $d_A$. The center point of the curvature with the transition radius $r_3$ of the third spring arm 20 is at the same time shifted towards the left through 0.11 outer diameter $d_A$ and upwards through 0.28 outer diameter $d_A$. In this way, the three center points are clearly defined relative to one another.

Each spring arm 20 advantageously has a linear region of constant width (b) between the turning point 26 and the outer rim 22 of the spring washer 18. This width (b) is advantageously 0.11 outer diameter $d_4$. The length of the straight region of the spring arm 20 is 0.43 outer diameter $d_4$ on the inner side, that is, on the side of the spring arm 20 which faces the central washer 24. The angle α between the straight region of a first spring arm 20 and the adjacent spring arm 20 is advantageously 11.9°. The spring thickness, that is, the extent of the spring washer 18 in the axial direction with respect to the longitudinal direction L is advantageously between 0.4 mm and 0.7 mm.

It is understood that the foregoing description is that of the preferred embodiments of the invention and that various changes and modifications may be made thereto without departing from the spirit and scope of the invention as defined in the appended claims.

LIST OF REFERENCE SYMBOLS

L Longitudinal axis
R Radial direction, perpendicular to the longitudinal axis L
a Extent
d Extent
D Extent
$d_4$ Outer diameter
$r_1$ Inner radius
$r_2$ Outer radius
$r_3$ Transition radius
b Width
α Angle
1 Actuator
2 Coil
2a First turns region of coil 2
2b Second turns region of coil 2
3 Spacer element between turns regions 2a, 2b
4 First conducting element
6 Collar-like projection
7 Collar-like projection
8 Magnet
10 Second conducting element
12 End face
14 End face
16 Spring
18 Spring washer
20 Spring arm
22 Outer rim
24 Central washer
26 Turning point

What is claimed is:

1. An actuator comprising:
an electrically conductive coil defining a longitudinal axis (L) and having a plurality of winding turns;
a magnet arranged in spaced radial relationship to said coil relative to said longitudinal axis (L);
said coil having a coil side facing away from said magnet;
a first conducting element having a mid region at least partially overlapping said coil side;
said magnet having a side facing away from said winding turns of said coil;
a second conducting element having a mid region at least partially overlapping said magnet on said side thereof;
said first conducting element extending beyond said coil in axial direction with reference to said longitudinal axis (L) whereat said first conducting element has respective collar-like projections;
said second conducting element extending beyond said magnet in axial direction with reference to said longitudinal axis (L) whereat said second conducting element has respective collar-like projections;
said coil having first and second winding turns regions;
said first winding turns region having a greater number of winding turns than said second winding turns region;
said first winding turns region having a first cross section and said second winding turns region having a second cross section greater than said first cross section; and,
said first winding turns region being operated at a frequency less than said second winding turns region.

2. The actuator of claim 1, wherein said first winding turns region and said second winding turns region are mutually connected in parallel.

3. The actuator of claim 1, wherein said first winding turns region and said second winding turns region each have the same number of winding turns.

4. The actuator of claim 1, wherein said first winding turns region and said second winding turns region have an unlike number of turns.

5. The actuator of claim 1, wherein said first winding turns region has a first winding turns cross section and said second winding turns region has a second winding turns cross section which is the same as said first winding turns cross section.

6. The actuator of claim 1, wherein said first winding turns region has a first winding turns cross section and said second winding turns region has a second winding turns cross section which is different than said first winding turns cross section.

7. The actuator of claim 1, wherein said first and second winding turns regions are supplied from a common voltage or current source.

8. The actuator of claim 1, wherein said first and second winding turns regions are supplied from different voltage or current sources.

9. The actuator of claim 1, wherein said first conducting element and/or said second conducting element has an extent (a) in the mid region thereof in a radial direction (R) with reference to said longitudinal axis (L) which is less than 3 mm.

10. The actuator of claim 1, wherein said first conducting element and/or said second conducting element has an extent (a) in the mid region thereof in a radial direction (R) with reference to said longitudinal axis (L) which is less than 2 mm.

11. The actuator of claim 1, wherein said magnet has an annular configuration arranged in surrounding relationship to said coil.

12. The actuator of claim 11, wherein said second conducting element is annularly arranged about said magnet and includes a plurality of parts.

13. The actuator of claim 12, wherein said parts are two in number and are configured as half-shells.

14. The actuator of claim 1, wherein said coil is configured to be disposed annularly around said magnet.

15. The actuator of claim 14, wherein said first conducting element is configured to be arranged annularly around said coil; and, said first conducting element includes a plurality of parts.

16. The actuator of claim 15, wherein said plurality of parts of said first conducting element are configured as two half-shells.

17. The actuator of claim 1, wherein said magnet has a greater extent in axial direction with reference to said longitudinal axis (L) than said coil and projects beyond said coil by an amount lying in a range of 2 mm to 5 mm.

18. The actuator of claim 1, wherein said collar-like projections of said first conducting element project beyond said magnet in axial direction with reference to said longitudinal axis (L) by an amount lying in a range of 1 mm to 3 mm.

19. The actuator of claim 1, further comprising a multi-arm plate spring and said coil and said first conducting element being spring supported on said multi-arm plate spring.

20. The actuator of claim 1, further comprising a multi-arm plate spring and said magnet and said second conducting element being spring supported on said multi-arm plate spring.

21. The actuator of claim 1, wherein said magnet has a greater extent in axial direction with reference to said longitudinal axis (L) than said coil and projects beyond said coil by an amount lying in a range of 3 mm to 5 mm.

22. The actuator of claim 1, wherein said magnet has a greater extent in axial direction with reference to said longitudinal axis (L) than said coil and projects beyond said coil by an amount of 4 mm.

23. The actuator of claim 1, wherein said collar-like projections of said first conducting element project beyond said magnet in axial direction with reference to said longitudinal axis (L) by an amount of 2 mm.

24. The actuator of claim 1, said first and second winding turns regions having a common region; and said first and second winding turns regions having turns arranged outside the common region.

25. The actuator of claim 1, wherein at least one of said first and second conducting element is made of soft-magnetic powder composite material; and, said soft-magnetic powder composite material includes individual grains of powder that are electrically insulated from one another by thin layers of synthetic resin.

26. An actuator comprising:

an electrically conductive coil defining a longitudinal axis (L) and having a plurality of winding turns;

a magnet arranged in spaced radial relationship to said coil relative to said longitudinal axis (L);

said coil having a coil side facing away from said magnet;

a first conducting element having a mid region at least partially overlapping said coil side;

said magnet having a side facing away from said winding turns of said coil;

a second conducting element having a mid region at least partially overlapping said magnet on said side thereof;

said first conducting element extending beyond said coil in axial direction with reference to said longitudinal axis (L) whereat said first conducting element has respective collar-like projections;

said second conducting element extending beyond said magnet in axial direction with reference to said longitudinal axis (L) whereat said second conducting element has respective collar-like projections;

said coil having first and second winding turns regions;

said collar-like projections of said first conducting element having respective extents (d) in axial direction with respect to said longitudinal axis (L);

said collar-like projections of said second conducting element having respective extents (D) in axial direction with respect to said longitudinal axis (L); and, said extent (d) and said extent (D) conjointly defining an extent ratio d/D lying in a range between 0.6 and 0.8.

* * * * *